Aug. 27, 1946.     H. G. ROGERS     2,406,403
POLYMERIZING APPARATUS AND METHOD
Filed May 1, 1943     2 Sheets-Sheet 2
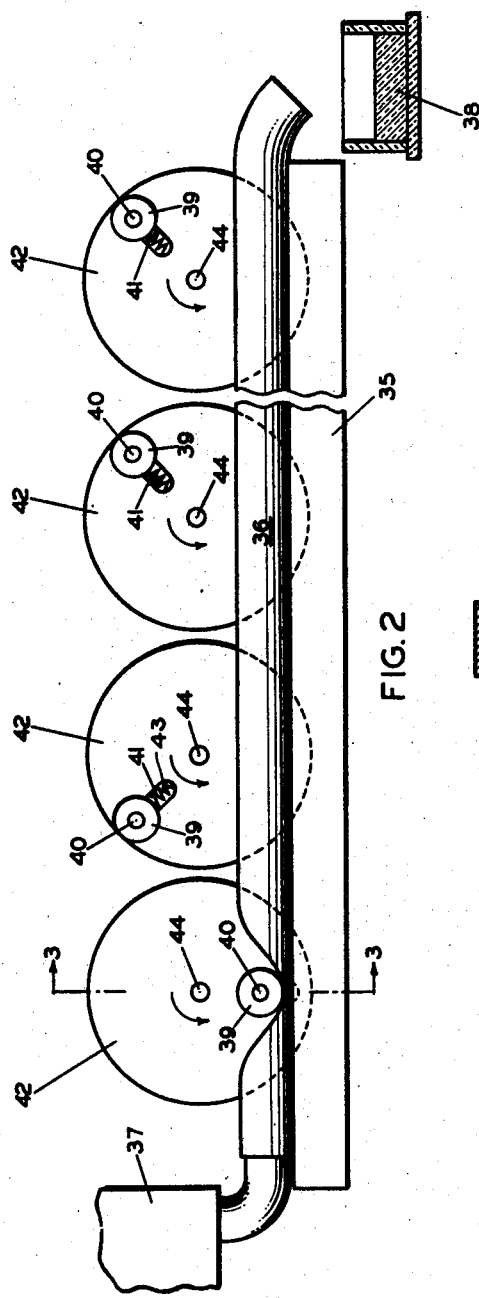
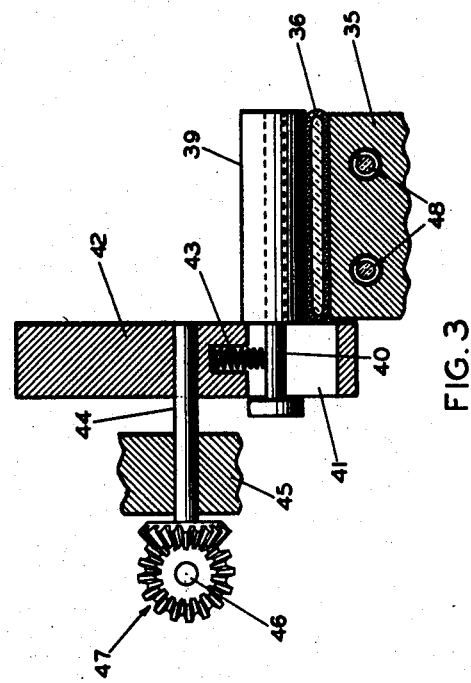
Howard G. Rogers
INVENTOR.
BY Donald L. Brown
Attorney Patented Aug. 27, 1946

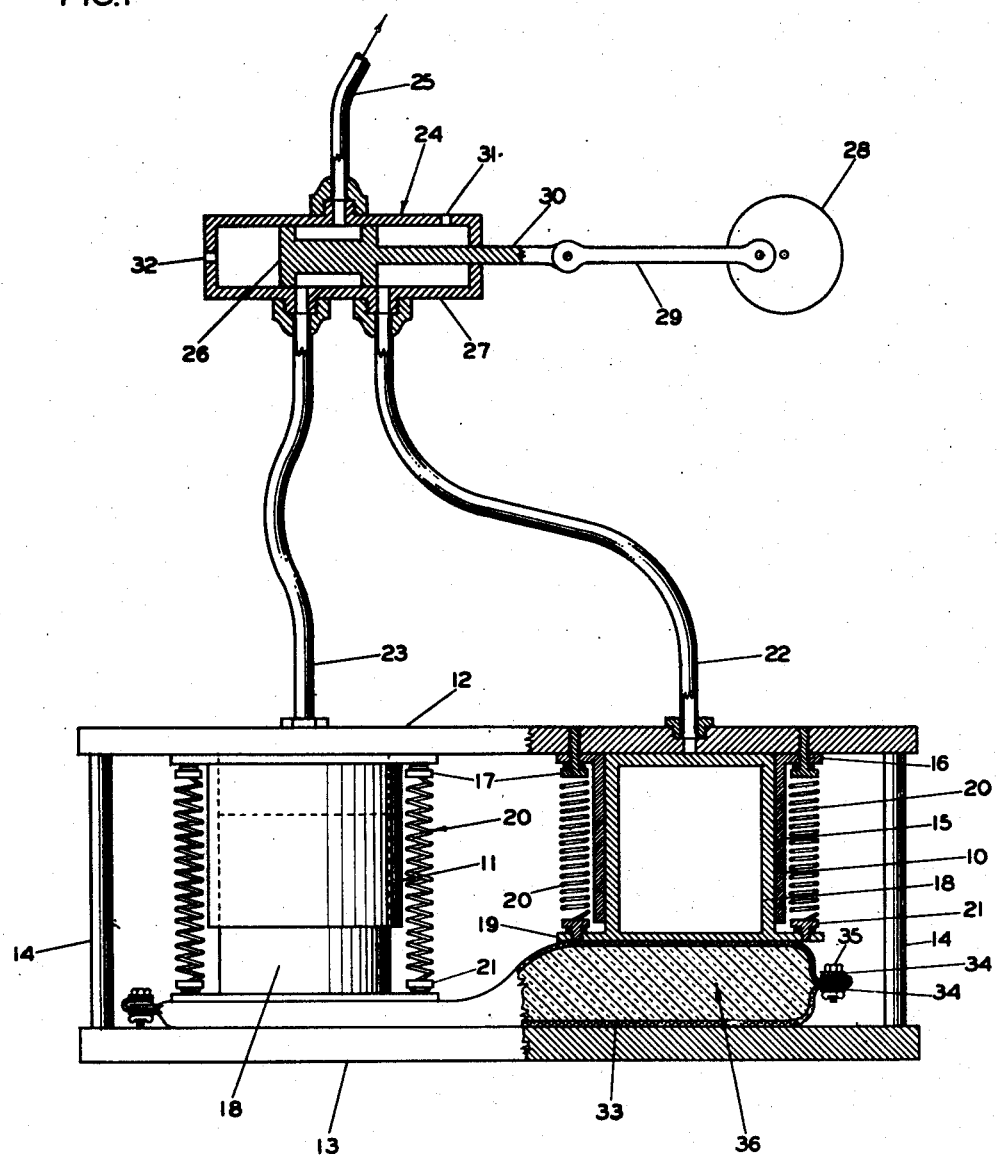

2,406,403

UNITED STATES PATENT OFFICE 2,406,403

POLYMERIZING APPARATUS AND METHOD

Howard G. Rogers, Wellesley Hills, Mass., assignor to Polaroid Corporation, Cambridge, Mass., a corporation of Delaware Application May 1, 1943, Serial No. 485,306

27 Claims. (Cl. 18—1)

This invention relates to the formation of plastic elements and more particularly to apparatus and methods for preparing a polymerizable monomer for molding.

In the fabrication of accurately surfaced and shaped plastic elements, such as lenses and prisms, best results are obtained when the plastic monomer is partially polymerized before being introduced into the mold for hardening. This minimizes shrinkage and heat of polymerization during hardening and tends to avoid surface deformation, non-homogeneity and internal strains in the finished product.

It is accordingly one object of the present invention to provide a novel method and apparatus whereby a monomer or a partial polymer may have a predetermined proportion of the monomer thereof polymerized to produce a homogeneous polymer-in-monomer solution, said solution being sufficiently fluid to be readily introduced into a mold.

Another object is to provide novel apparatus of the above type which is adapted to effect or advance the partial polymerization to obtain a viscous, homogeneous mass.

Still another object is to provide a novel apparatus of the above character whereby a continuous output of partial polymer having a predetermined concentration of polymer may be obtained.

A further object is to provide novel apparatus whereby a fluid mass may be subjected to mixing and circulation by mechanical kneading.

Still further objects are to provide novel apparatus wherein a plastic mass is adapted to be partially polymerized and a novel method of introducing the mass into a mold from said apparatus.

Still another object is to provide a device of the above character which, when utilized for polymerizing a monomer, does not inhibit polymerization.

Further objects are the provision of a simple, compact, durable and inexpensive device for subjecting different portions of a yielding mass to pressure and of novel yielding means for cooperating with said device, said means being adapted to contain a quantity of polymerizable material, such as styrene, without contaminating or exposing the latter to the atmosphere.

The above and other objects and novel features of the invention will more fully appear from the following detailed description when the same is read in connection with the accompanying drawings. It is to be expressly understood, however, that the drawings are for purposes of illustration only and are not intended as a definition of the limits of the invention, reference being primarily had for this latter purpose to the appended claims.

In the drawings wherein like reference characters refer to like parts throughout the several views;

Figure 1 is a view, partly in elevation and partly in section, of one form of apparatus for carrying out the present invention;

Fig. 2 is a view, partly in elevation and with parts broken away, showing another embodiment of the invention whereby a continuous output of partial polymer may be obtained; and Fig. 3 is a sectional view with parts broken away, taken substantially along line 3—3 of Fig. 2.

The apparatus illustrated in Fig. 1, by way of example, comprises a pair of laterally spaced, parallel piston and cylinder mechanisms 10 and 11 suitably mounted on a support consisting of a pair of substantially parallel, vertically spaced plates 12 and 13, said plates being rigidly held in spaced relation by a plurality of vertical members, such as rods 14. Mechanisms 10 and 11 are alike and accordingly only one is described in detail, corresponding numerals designating like parts of said mechanism.

As shown, mechanism 10 comprises a cylinder 15 having a flanged upper end 16 whereby it is rigidly secured to upper plate 12, for example by screws 17. A hollow piston 18 is slidably mounted in said cylinder, and has the lower end thereof closed and provided with an outwardly extending flange 19 whereby a substantially flat surface of comparatively large area is provided at the lower end of said piston. Means are provided for resiliently opposing downward movement of plunger 18, said means, as shown, consisting of a plurality of coiled springs 20 which are preferably under tension and which have the ends thereof secured to flanges 16 and 19. Screws 17 are preferably utilized to secure the upper end of each of said springs to flange 16, and screws 21 may be provided for similarly securing the lower end of each of said springs to flange 19.

To move plungers 18 downwardly against the resistance of springs 20, fluid under pressure is introduced into the upper end of each of the cylinders 15 of mechanisms 10 and 11, and, in the form illustrated, the means for accomplishing this comprise conduits 22 and 23, respectively, each of which communicates at one end with a cylinder end and at the other end is adapted to be connected by suitable valve means 24 to a conduit 25, the latter conduit being, in turn, connected to a source of compressed air, as for example a pump (not shown). Valve means 24 acts to alternately admit and exhaust air to and from each of cylinders 15 and also governs the flow of air so that while air is being admitted to one of said cylinders it is being exhausted from the other, causing plungers 18 to move in opposite directions.

Valve means 24 preferably comprises a piston-type slide valve 26 mounted for reciprocation in a cylinder 27 and actuated by suitable means, such as a crank 28, which is connected by a link 29 to valve rod 30. A pair of exhaust ports 31 and 32 are provided in opposite ends of said cylinder and are adapted to cooperate with conduits 22 and 23, respectively, to permit air to be discharged from mechanisms 10 and 11 at predetermined points in the valve stroke. In operation, reciprocation of valve 26 alternately connects conduit 23 to conduit 25 and to port 32 and also alternately connects conduit 22 to conduit 25 and to port 31, the connections being such that when conduit 23 communicates with conduit 25, conduit 22 communicates with exhaust port 31, and when conduit 23 communicates with port 32, conduit 22 is open to conduit 25. Accordingly, for each revolution of crank 28, plungers 18 move through a complete cycle and in opposite directions.

In order to polymerize a plastic monomer such as styrene, a novel means is provided for co-operation with the above described mechanism, comprising a flexible container 33 formed of or internally lined with a material which is inert to said monomer, polyvinyl alcohol constituting a satisfactory material for styrene. Container 33 initially has a cylindrical shape and is open at both ends, one end thereof being thereafter sealed by overlapping the marginal portions thereof and clamping the overlapping portions between two metallic strips 34 which are secured to each other by bolts 35. The container is then partially filled with styrene monomer 36, or other polymerizable plastic, and the air is exhausted therefrom by compressing the walls of the container until the monomer level is substantially flush with the open end of said container, the marginal portions of the latter end being thereafter overlapped and sealed in the manner previously described. The partially filled and sealed container is positioned lengthwise beneath plungers 18 of mechanisms 10 and 11 so that portions thereof are disposed opposite the lower ends of said plungers. When the latter are rendered operative, opposite ends of said container are alternately pressed between said plungers and plate 13, causing the solution in the container to flow from one end to the other.

When polymerizing styrene monomer in the above manner, the kneading by mechanisms 10 and 11 is carried out in an oven or other apparatus for maintaining container 33 and its contents at an elevated temperature, as for example between 60 and 70° C. Crank 28 is preferably rotated at approximately from 1 to 10 R. P. M. during the polymerization, although the speed thereof may vary over a wide range without producing unsatisfactory results.

It is to be expressly understood that the above apparatus and method may also be used for advancing the polymerization of a partially polymerized solution. For example, styrene or other plastic monomer may be initially partially polymerized and then the polymer solution may be introduced into container 33 and the latter subjected to the mechanical kneading of apparatus 10, 11. The latter operation acts to increase the polymer concentration while maintaining the solution homogeneous and in condition for introduction into a mold. The introduction into the mold may be accomplished either by pouring or by injecting the partial polymer from container 33. A method of readily injecting the polymeric mass into the mold in a novel manner consists in forming an orifice in the container preferably at one end thereof and thereafter squeezing the material from the container through said orifice into the mold. By means of the above method and apparatus, partial polymers suitable for molding optical elements have been obtained which have a polymeric concentration between 65 and 70 percent.

Referring to Figs. 2 and 3, there is shown somewhat diagrammatically another embodiment of the invention whereby a continuous output of partial polymer of predetermined polymer concentration may be obtained. In the form illustrated, the novel apparatus comprises a platform 35 having mounted thereon a comparatively long, deformable, open ended container or tube 36 which is impervious to air and is internally lined with, or formed from, a material that is inert to the mass which is to be polymerized. It is satisfactory, particularly for the polymerization of styrene and cyclohexyl methacrylate, to form said container from laminated polyvinyl alcohol sheet, or from canvas internally lined with polyvinyl alcohol.

According to the novel method of the present invention the mass to be polymerized, for example styrene monomer, is continuously fed into one end of tube 36 as from a tank or other source 37, and is continuously discharged from its other end into a storage container or directly into molding apparatus such as a prism mold 38.

In order to mechanically knead the polymerized mass admitted into tube 36 and simultaneously propel said mass from the input to the discharge end of said tube, a plurality of members, such as rollers 39, are provided which are adapted to engage successive longitudinal portions of said tube at different times to press together the walls of said tube and squeeze the polymerized mass in the desired direction. In the form illustrated, rollers 39 are mounted for rotary and limited radial movement about axes which are fixed relative to platform 35 in a plane substantially parallel to said platform, said axes being spaced longitudinally so that each extends over a different portion of said tube and is substantially perpendicular to the longitudinal axis of the latter. To this end, each of rollers 39 is mounted on a shaft 40 which has one end thereof slidably mounted in a radial slot 41 provided in a disc 42, said shaft being preferably biased radially outward by suitable means, such as a coil spring 43, carried by said disc. Discs 42 are, in turn, mounted on shafts 44 journalled in bearings 45 (Fig. 3) which are fixed relative to platform 35, shafts 44 being driven, for example, from a common drive shaft 46 by means of helical gear drives 47.

In operation, each of discs 42 is rotated at the same speed and preferably in the same direction, i. e., counterclockwise, as viewed in Fig. 2, and rollers 39 are caused to engage the walls of tube 36 and press the latter together while moving from left to right over said tube. By mounting said rollers for radial displacement relative to disc 42, contact between the tube and the rollers may be maintained for almost 120° of each revolution of said discs. Each of rollers 39 of successive discs lags the previous roller, i. e., the roller to the left thereof, by approximately 120° so that the portion of the polymerizable mass propelled forward by one of said rollers is, upon disengagement of the latter roller from the tube, acted upon by the next roller and pressed further forward thereby. A sufficient number of rollers 39 is provided to impart to the polymerizable mass which is discharged the desired viscosity and polymer concentration. To maintain the mass in container 36 at an elevated temperature, as for example of 60° to 70° C. when styrene is being polymerized, a plurality of heating coils 48 may be embodied in platform 35.

There is thus provided a novel method whereby a plastic monomer may be partially polymerized or a partially polymerized solution may have the polymer concentration thereof readily increased to produce a homogeneous fluid or viscous mass. Suitable means are provided for carrying out the partial polymerization in batches and also for carrying out the partial polymerization continuously. Each apparatus produces the polymer solution without inhibiting the polymerization and is capable of subjecting a fluid to a thorough mixture in an atmosphere which is inert to said fluid. There is also provided a novel means for containing a polymerizable mass and apparatus for subjecting said means to a mechanical kneading whereby the mass is alternately and/or continuously circulated from one end of the container to the other. There is additionally provided a novel method for injecting moldable material into a mold from the container of the apparatus for carrying out the polymerization in batches.

Although only two embodiments of the invention have been illustrated and described, it is to be expressly understood that the same is not limited thereto. For example, it will now be apparent to those skilled in the art that other types of valve means may be substituted for the piston-type valve means 24. It is also to be understood that rotary rollers mounted as shown in Figs. 2 and 3, may be used instead of the plungers of Fig. 1 to carry out the discontinuous method of polymerization of the latter apparatus, or that a plurality of cylinders and plungers could be substituted for the roller arrangement of Figs. 2 and 3 to effect the continuous polymerization. Moreover, one or more of rollers 39 in the apparatus of Figs. 2 and 3 may be rotated in an opposite direction to the others to augment the mixing effect. Other means for applying pressure to a deformable container so as to mix and advance the polymerization of a given polymerizable mass, in accordance with the present invention, may also be employed, as will now be apparent to those skilled in the art. Various other changes may be made in the design and arrangement of parts without departing from the spirit and scope of the invention.

It is also to be understood that the following claims are intended to cover all the generic and specific features of the invention herein described, and all statements of the scope of the invention which, as a matter of language, might be said to fall therebetween.

What is claimed is:

1. The method of advancing the polymerization of a fluid mass of polymerizable plastic material which comprises confining said mass in a deformable container, maintaining said container at a temperature adapted to induce polymerization of said plastic, and successively compressing different portions of said container to cause a circulation and mixing of said mass.

2. The method of advancing the polymerization of a fluid mass of polymerizable plastic material which comprises confining said mass in a deformable container which is inert to said mass, maintaining said container at a temperature adapted to induce polymerization of said plastic, and successively compressing different portions of said container to cause a circulation and mixing of said mass.

3. The method of advancing the polymerization of a fluid mass of polymerizable plastic material which comprises confining said mass in a deformable container, maintaining said container at a temperature adapted to induce polymerization of said plastic, and causing circulation and mixing of said mass within said container by applying pressure to said container.

4. The method of advancing the polymerization of a fluid mass of polymerizable plastic material which comprises confining said mass in a deformable container, maintaining said container at a temperature adapted to induce polymerization of said plastic, and causing circulation and mixing of said mass within said container by changing the shape of said container.

5. The method of advancing the polymerization of a fluid mass of polymerizable plastic material which comprises confining said mass in a deformable container, maintaining said container at a temperature adapted to induce polymerization of said plastic, and causing circulation and mixing of said mass within said container by continuously changing the shape of said container.

6. The method of polymerizing styrene monomer which includes the steps of confining a mass of said monomer in a polyvinyl alcohol container, maintaining the container at a temperature between 60 and 70 degrees C., and alternately and repeatedly pressing together the side walls adjacent opposite ends of said container to reciprocate said mass from one end of said container to the other.

7. The method of polymerizing styrene monomer which includes the steps of confining a mass comprising said monomer in a deformable container having an internal surface which is inert to styrene, exhausting the air from the container, sealing the container, maintaining the sealed container at a temperature adapted to induce polymerization, and alternately and repeatedly pressing together the side walls adjacent opposite ends of said container to reciprocate said mass from one end of said container to the other.

8. The method of polymerizing a monomer which constitutes part or all of a fluid mass, which comprises confining the mass in a deformable container, and polymerizing said monomer in said container while kneading said container to induce circulation and mixing of said mass.

9. The method of advancing the polymerization of a fluid mass of polymerizable plastic material which comprises continuously introducing said mass into one end of a container of substantial length which is inert to said mass, maintaining said container at a temperature adapted to produce polymerization of said plastic, successively compressing successive, longitudinal portions of said container to mix said mass and cause a continuous flow of said mass through the container, and discharging the polymerized mass from the other end of said container.

10. Apparatus of the character described comprising, in combination, a deformable fluid-tight container adapted to be partially filled with a mass of polymerizable plastic material, means sealing back ends of said container, means for supporting said sealed container, and means comprising a plurality of reciprocating elements adapted to alternately engage and compress different portions of said container to induce a reciprocating circulation of the mass contained therein.

11. In apparatus of the class described, yieldable means adapted to contain a fluid mass, means comprising a plurality of movable members for applying pressure to different portions of said yieldable means at different times whereby a circulation of said mass is obtained, and means for heating said fluid mass.

12. In apparatus for polymerizing a fluid mass comprising a quantity of monomer, in combination, a flexible container adapted to be partially filled with said mass, a plurality of mechanisms, each of said mechanisms comprising a movable member, means for supporting said container so that a different portion thereof is disposed adjacent each said member, and means comprising a source of compressed air and valve means cooperating therewith for actuating said members so that each successively engages and compresses the portion of said container thereadjacent.

13. In apparatus for polymerizing a fluid mass comprising a quantity of monomer, in combination, a flexible container adapted to be partially filled with said mass, means for sealing the ends of said container to render the latter fluid-tight, a plurality of mechanisms, each of said mechanisms comprising a movable member, means for supporting said sealed container so that a different portion thereof is disposed adjacent each said member, and means for actuating said members so that each successively engages and compresses the portion of said container thereadjacent to induce reciprocating circulation of said mass, said actuating means being adapted to apply pressure to any predetermined one of said members simultaneously with the release of pressure from another of said members.

14. In apparatus of the class described, supporting means including a platform, a plurality of cylinders rigidly supported by said supporting means and each having its axis disposed substantially perpendicularly to said platform, a plunger slidably mounted in each said cylinder for reciprocation toward and away from said platform, resilient means normally opposing movement of each said plunger in the direction of said platform, means communicating with each of said cylinders, and means including valve means alternately admitting and exhausting compressed air to and from each said cylinder to effect reciprocation of said plungers.

15. Apparatus of the character described comprising, in combination, a deformable container open at both ends thereof, means for admitting a mass of polymerizable material into one end of said container, a plurality of rotating elements adapted to engage and successively compress successive portions of said container to propel said polymerizable mass through said container and discharge the same at the other end of said container, and means for heating the polymerizable material within said container.

16. In apparatus for advancing the polymerization of a mass of polymerizable plastic material, a flexible container for said material, a plurality of mechanisms for compressing different portions of said container to circulate and mix said material, each of said mechanisms comprising a disc, a roller eccentrically mounted on said disc for rotary movement therewith and for limited radial movement relatively thereto, and means for rotating said disc whereby said roller is caused to engage and compress said container during a substantial part of the travel of said roller.

17. Apparatus of the character described comprising, in combination, a deformable container open at both ends thereof, means for admitting a mass of polymerizable material into one end of said container, a plurality of movable elements adapted to engage and successively compress successive portions of said container to propel said polymerizable mass through said container and discharge the same at the other end of said container, and means for heating the polymerizable material within said container.

18. Apparatus of the character described comprising, in combination, a deformable container open at both ends thereof, means comprising a support for said container, heating elements in said support for heating the contents of said container, means for admitting a mass of polymerizable material into one end of said container and a plurality of movable elements adapted to engage and successively compress successive portions of said container to propel said polymerizable mass through said container and discharge the same at the other end of said container.

19. Apparatus of the character described comprising, in combination, a tubular container of substantial length open at both ends thereof and formed from a flexible material, means comprising a support for said container, heating elements in said support for heating the contents of said container, means for admitting a mass of polymerizable material into one end of said container, said container having the internal surface thereof inert to said polymerizable mass, and a plurality of movable elements adapted to engage and successively compress successive portions of said container to propel said polymerizable mass through said container and discharge the same at the other end of said container.

20. In apparatus for advancing the polymerization of a mass of polymerizable, plastic material, a flexible container for said material, a plurality of mechanisms for compressing different portions of said container to circulate and mix said material, each of said mechanisms comprising a disc and a roller eccentrically mounted on said disc for rotary movement therewith and for limited radial movement relative thereto, and means for rotating said discs to bring said rollers successively into contact with said container.

21. The method of advancing the polymerization of a fluid mass of polymerizable plastic material, which comprises introducing said mass into one end of a container, maintaining said container at a temperature adapted to induce polymerization of said plastic, successively compressing different portions of said container to mix said mass and to cause said mass to flow through the container, and discharging the polymerized mass from the other end of said container.

22. The method of advancing the polymerization of a fluid mass of polymerizable plastic material, which comprises introducing said mass into one end of a container which is inert to said mass, maintaining said container at a temperature adapted to induce polymerization of said plastic, successively compressing different portions of said container to mix said mass and to cause said mass to flow through the container, and discharging the polymerized mass from the other end of said container.

23. The method of advancing the polymerization of a fluid mass of polymerizable plastic material, which comprises introducing said mass into one end of a container, maintaining said container at a temperature adapted to induce polymerization of said plastic, causing said mass to flow through said container by applying pressure to said container, and discharging the polymerized mass from the other end of said container.

24. The method of advancing the polymerization of a fluid mass of polymerizable plastic material, which comprises introducing said mass into one end of a container, maintaining said container at a temperature adapted to induce polymerization of said plastic, causing said mass to flow through said container by changing the shape of said container, and discharging the polymerized mass from the other end of said container.

25. In apparatus for advancing the polymerization of a fluid mass comprising a quantity of monomer, in combination, a flexible container adapted to be partially filled with said mass, a plurality of mechanisms, each of said mechanisms comprising a movable member, means for supporting said container so that a different portion thereof is disposed adjacent each said member, means for actuating said members so that each successively engages and compresses the portion of said container thereadjacent, and means for heating said container and the contents thereof to a temperature adapted to induce polymerization.

26. Apparatus of the character described comprising, in combination, a deformable container adapted to be partially filled with a mass of polymerizable plastic material, means for sealing said container, means for supporting said sealed container, and means comprising a plurality of movable elements adapted to engage and compress different portions of said container to induce reciprocating circulation of the mass contained therein.

27. In apparatus for polymerizing a fluid mass comprising a quantity of monomer, in combination, a flexible container adapted to be partially filled with said mass, means for sealing said container, a plurality of mechanisms, each of said mechanisms comprising a movable member, means for supporting said container so that a different portion thereof is disposed adjacent each said member, and means for actuating said members so that each successively engages and compresses a portion of said container thereadjacent.

HOWARD G. ROGERS.